(12) United States Patent
Cholley et al.

(10) Patent No.: US 8,708,605 B2
(45) Date of Patent: Apr. 29, 2014

(54) STRUCTURE FOR TRANSPORT AND OFFSHORE INSTALLATION OF AT LEAST ONE WIND TURBINE OR UNDERWATER GENERATOR, AND METHODS FOR TRANSPORT AND OFFSHORE INSTALLATION OF AT LEAST ONE WIND TURBINE OR UNDERWATER GENERATOR

(75) Inventors: Jean-Marc Cholley, Taverny (FR); Eric Luquiau, Sartrouville (FR)

(73) Assignee: Technip France (FR)

( * ) Notice: Subject to any disclaimer, the term of this patent is extended or adjusted under 35 U.S.C. 154(b) by 490 days.

(21) Appl. No.: 12/999,761

(22) PCT Filed: Jun. 19, 2009

(86) PCT No.: PCT/FR2009/051175
§ 371 (c)(1),
(2), (4) Date: Feb. 2, 2011

(87) PCT Pub. No.: WO2009/153530
PCT Pub. Date: Dec. 23, 2009

(65) Prior Publication Data
US 2011/0139056 A1 Jun. 16, 2011

(30) Foreign Application Priority Data
Jun. 20, 2008 (FR) ...................... 08 54097

(51) Int. Cl.
*B63B 35/00* (2006.01)
(52) U.S. Cl.
USPC .......................... 405/209; 114/264

(58) Field of Classification Search
USPC .............. 405/195.1, 198, 199, 203–206, 209, 405/224; 114/264, 265
See application file for complete search history.

(56) References Cited

U.S. PATENT DOCUMENTS

| | | | | |
|---|---|---|---|---|
| 3,874,180 A * | 4/1975 | Sumner | ........................ | 405/198 |
| 6,488,446 B1 * | 12/2002 | Riemers | ........................ | 405/203 |
| 7,234,409 B2 * | 6/2007 | Hansen | ........................ | 114/258 |
| 7,513,713 B2 * | 4/2009 | Thomas et al. | ............... | 405/203 |
| 8,070,388 B2 * | 12/2011 | Thomas | ........................ | 405/203 |
| 2004/0262926 A1 | 12/2004 | Hansen | | |

FOREIGN PATENT DOCUMENTS

| | | |
|---|---|---|
| DE | 200 10 086 U1 | 11/2000 |
| WO | WO 03/066427 A | 8/2003 |
| WO | WO 03/093584 A | 11/2003 |

OTHER PUBLICATIONS

International Search Report dated Dec. 17, 2009, issued in corresponding international application No. PCT/FR2009/051175.

* cited by examiner

*Primary Examiner* — Tara M. Pinnock
(74) *Attorney, Agent, or Firm* — Ostrolenk Faber LLP

(57) ABSTRACT

A structure for transport and offshore installation of at least one wind turbine or underwater generator includes a U-shaped floating hull having lateral arms. Each lateral arm has at least one leg vertically movable by the hull in flotation, and at least one assembly for supporting a wind turbine or underwater generator. The assembly includes two shuttles opposite each other and each combined with a leg and each having higher and lower pairs of arms which are pivotably movable between a retracted position and an active position tilted against a mast of the wind turbine or underwater generator.

15 Claims, 15 Drawing Sheets

STRUCTURE FOR TRANSPORT AND OFFSHORE INSTALLATION OF AT LEAST ONE WIND TURBINE OR UNDERWATER GENERATOR, AND METHODS FOR TRANSPORT AND OFFSHORE INSTALLATION OF AT LEAST ONE WIND TURBINE OR UNDERWATER GENERATOR

CROSS REFERENCE TO RELATED APPLICATIONS

The present application is a 35 U.S.C. §371 National Phase conversion of PCT/FR2009/051175, filed Jun. 19, 2009, which claims benefit of French Application No. 0854097, filed Jun. 20, 2008, the disclosure of which is incorporated herein by reference. The PCT International Application was published in the French language.

BACKGROUND OF THE INVENTION

The present invention relates to a structure for transport and offshore installation of at least one wind turbine or underwater generator.

The invention also relates to methods for transport and offshore installation of at least one wind turbine or underwater generator using such a structure.

Traditionally, wind turbines or underwater generators include a mast having a nacelle containing an electrical production means driven by blades.

The mast is mounted on a base secured on the ground or on a sea bottom for an offshore installation.

In the case of wind turbines, the nacelle is fastened to the upper end of the mast and the blades are driven in rotation by the wind.

In the case of underwater generators, the nacelle supported by the mast is placed below the surface of the water and the blades are driven in rotation by the ebb and flow of the water.

The offshore installation of wind turbines or underwater generators consists of placing and fixing the base on the sea bottom, then bringing, most often by transport vessel, the other part of the wind turbines or underwater generators, i.e. the mast bearing the nacelle and the blades.

The mast bearing the nacelle and the blades is placed on the base using different methods.

One known method consists of transporting the mast in a vertical position and suspending said mast from a hoisting apparatus, e.g. a crane supported by a vessel, then gradually lowering the mast using the crane to engage its lower end in the base.

Another known method consists of transporting the mast equipped with its nacelle and its blades in the horizontal position on a vessel, then tilting the mast into a vertical position and gradually lowering the mast using a guide column in order to engage its lower end in the base.

But these known methods have a significant drawback.

Indeed, during the gradual lowering of the mast, the mast is borne by a vessel that is subject to the motion of the swell, with the result that the mast oscillates, which requires that its lower end be held to engage it in the base.

Once its lower end is engaged in the base, the mast still undergoes the motions of the vessel, which can cause significant stresses or strains in the base and buckling of the mast as long as the mast is connected to the vessel.

SUMMARY OF THE INVENTION

The invention aims to propose a structure for transport and offshore installation of at least one wind turbine or underwater generator that avoids this drawback.

The invention therefore relates to a structure for transport and offshore installation of at least one wind turbine or underwater generator comprising a nacelle and blades borne by a mast intended to be mounted on a base anchored on the sea bottom, the structure including:

a U-shaped floating hull provided with two parallel lateral arms, each having at least one leg vertically movable relative to the hull in flotation using movement mechanisms, and at least one assembly for supporting the at least one wind turbine or underwater generator, made up of two shuttles opposite each other and each combined with a leg and each having two pairs of arms that are higher and lower, respectively, and pivotably movable around a horizontal axis between a retracted position and an active position tilted against the mast of the wind turbine or underwater generator, the arms of the pair of higher arms including a means for offsetting horizontal movements of the hull relative to the mast after the mast is introduced into the base and after the tilting of the pair of lower arms to the retracted position.

According to other features of the invention:

the structure includes two symmetrical assemblies each supporting a mast of a wind turbine or underwater generator, each shuttle includes a means for locking on the corresponding leg, each arm of the pair of higher arms has a length substantially equal to the height of the mast, each arm of the pair of lower arms has a length substantially equal to half the distance separating the inner edges of the two lateral arms of the hull, the free ends of the arms of the pair of lower arms together include an assembly for gripping the mast, the offsetting means mounted at the free ends of the arms of the pair of higher arms include an assembly for supporting the mast via a collar formed on the mast and a sliding means for the horizontal movements of the hull relative to the mast after the introduction of the mast in the base and the tilting of the pair of lower arms to the retracted position, the sliding means of the support assembly comprises, a plate provided with a U-shaped housing, fastened to the free end of one of the arms of the pair of higher arms and intended to cooperate with a locking system mounted at the free end of the other arm of the pair of higher arms and, a platen provided with a U-shaped housing and movable via rolling members on the plate along a plane parallel to the assembly for supporting the mast, the directions of movement of the platen on the plate form a 120° angle between them, the platen includes a latch for closing the U-shaped housing, the U-shaped housings, of the plate and the platen, respectively, are oriented perpendicularly to the longitudinal axis of the hull, the U-shaped housings, of the plate and the platen, respectively, are oriented in the longitudinal axis of the hull towards the open portion of the hull.

The invention also relates to a method for transport an d offshore installation of at least one wind turbine or underwater generator using a structure as previously defined, the method including the following steps:

positioning the structure near a loading zone of the wind turbine or underwater generator;

placing the legs in the high position and the shuttles in the low position bearing against the hull with the arms of the two pairs of arms in the retracted position, lifting the wind turbine or underwater generator and placing the mast of the wind turbine or underwater generator between the two lateral arms of the hull, tilting the arm including the U-shaped housings of the pair of higher arms to the active position to place the mast in the U-shaped housings below the collar, tilting the other arm of the pair of higher arms to the active position and locking the arms relative to each other, closing the U-shaped housing of the platen using the latch, lowering the mast to make the collar bear on the platen, simultaneously tilting the arms of the pair of lower arms to the active position to hold the lower portion of the mast, locking the platen to the arms, moving the structure bearing the at least one wind turbine or underwater generator to an installation site on a base previously installed on the sea bottom, lowering the legs and locking each shuttle on the corresponding leg, raising the legs to lift the mast using the shuttles and pairs of arms, moving the structure to position the mast in alignment with the base, unlocking the platen from the arms, tilting the arms of the pair of lower arms to the retracted position, the horizontal movements of the hull being offset by the offsetting means of the pair of higher arms, lowering, the legs, the shuttles and the pairs of higher arms to place the mast in the base, opening the U-shaped housing of the platen, unlocking the arms of the pair of higher arms, tilting the arms of the pair of higher arms to the retracted position, and removing the structure.

The invention also relates to a method for transport and offshore installation of at least one wind turbine or underwater generator using a structure as previously defined, the method including the following steps:

opening the door of the structure, placing the legs in an intermediate position and the shuttles in a low position bearing against the hull, placing the arms of the pair of higher arms in the active position and locking them relative to each other with the U-shaped housing of the open platen, moving the structure to place a pontoon including at least one wind turbine or underwater generator between the lateral arms of the hull, engaging the mast in the U-shaped housings of the plate and the platen, closing the housing of the platen using the latch, simultaneously tilting the arms of the pair of lower arms to hold the lower portion of the mast, locking each shuttle on the corresponding leg, raising the legs to lift the shuttles and the pairs of arms to bring the platen in contact with the collar of the mast, raising the mast from the pontoon via shuttles and pairs of arms by lifting the legs, removing the structure bearing at least one wind turbine to place it away from the pontoon, relowering the legs to replace the shuttles in the lower position bearing against the hull, unlocking each shuttle on the corresponding leg, lifting the legs to the higher position, closing the door of the structure, moving the structure bearing the at least one wind turbine or underwater generator to an installation site on a base previously installed on the sea bottom, lowering the legs to a low or intermediate position, locking each shuttle on the corresponding leg, raising the legs to lift the mast using shuttles and pairs of arms, moving the structure to position the mast in alignment with the base, tilting the arms of the pair of lower arms to the retracted position, the horizontal movements of the hull being offset by the offsetting means of the pair of higher arms, lowering the legs, the shuttles and the pair of higher arms to place the mast in the base, opening the U-shaped housing of the platen, unlocking the arms of the pair of higher arms, tilting the arms of the pair of higher arms to the retracted position, and removing the structure.

BRIEF DESCRIPTION OF THE DRAWINGS

The invention will be better understood upon reading the following description, provided solely as an example and done in reference to the appended drawings, in which.

DESCRIPTION OF PREFERRED EMOBODIMENTS

Figure 1:
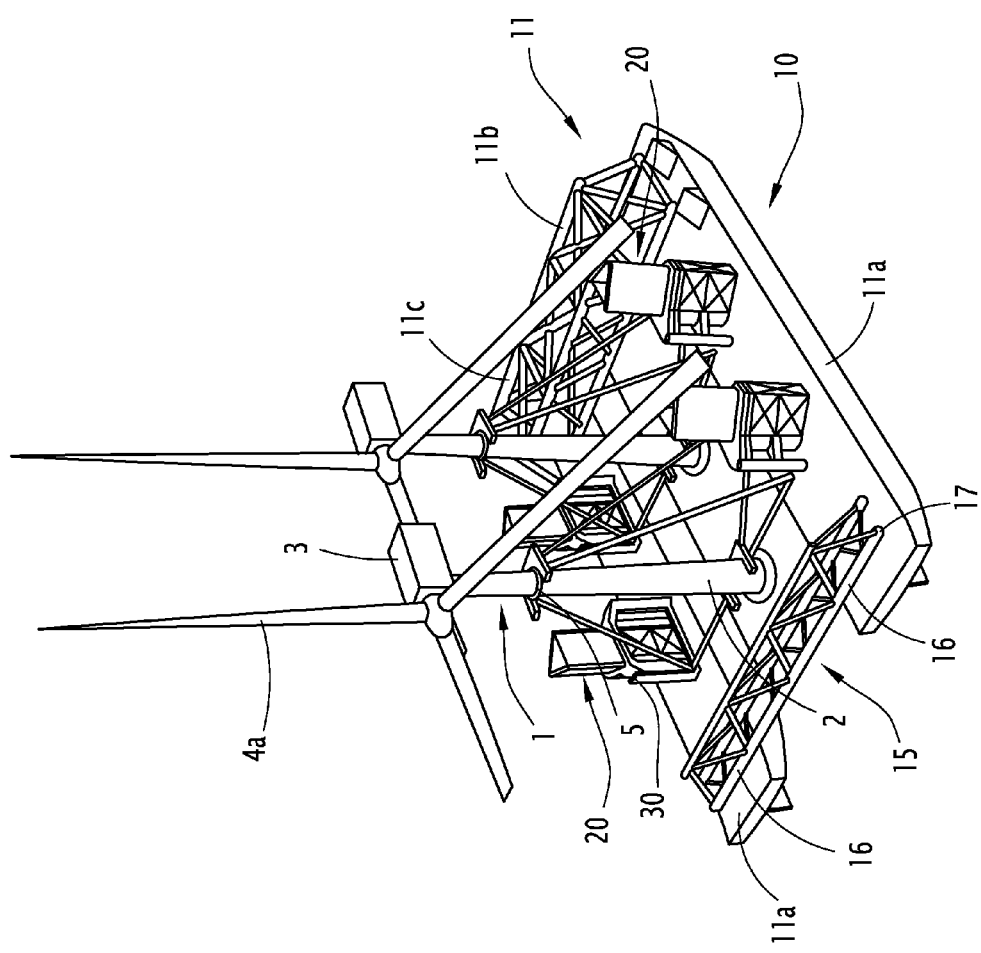
FIG. 1 is a diagrammatic perspective view of a structure for transport and offshore installation of at least one wind turbine, according to the invention.
Figure 2:
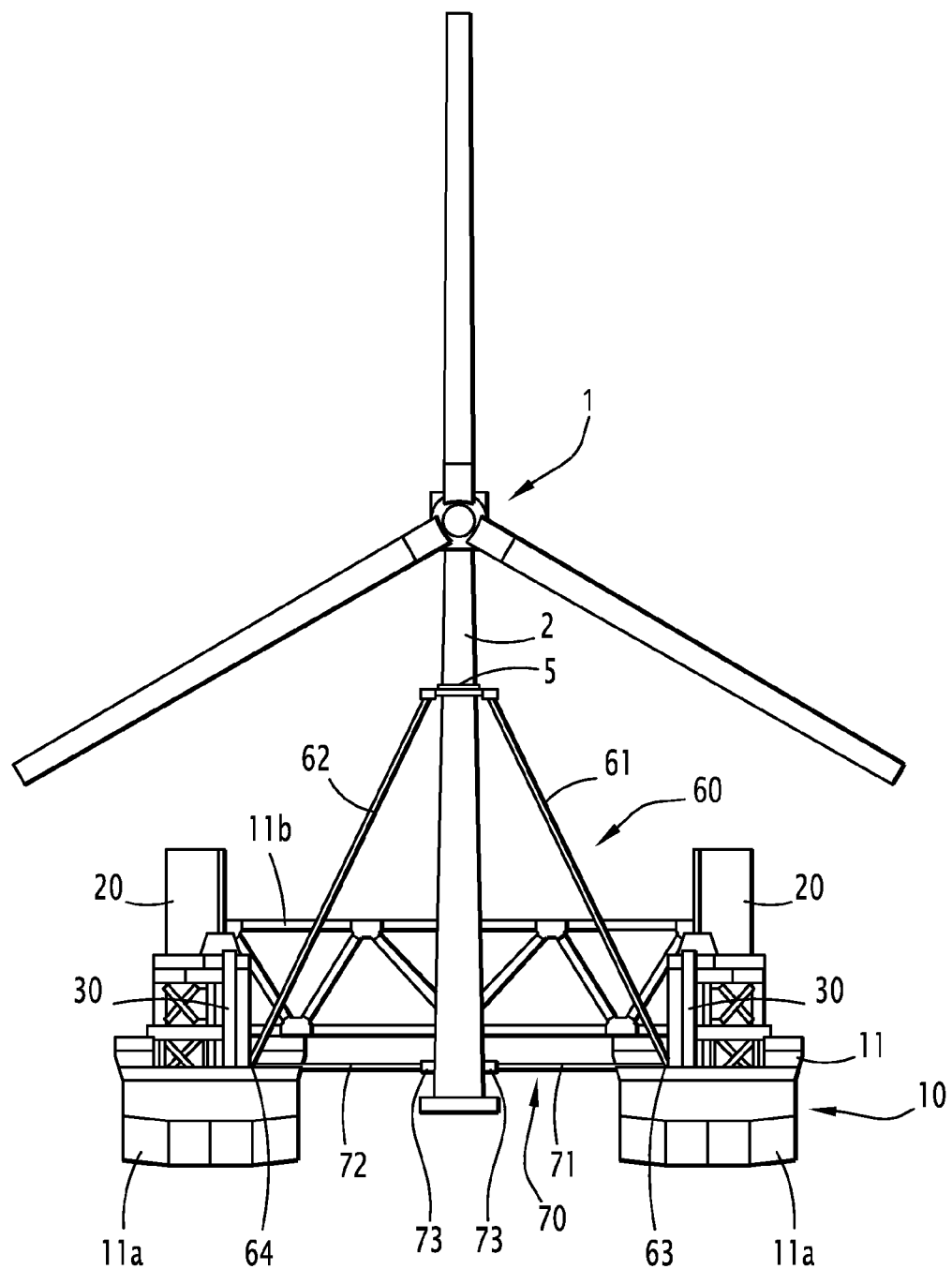
FIG. 2 is a diagrammatic front view of the structure, according to the invention.
Figure 3:
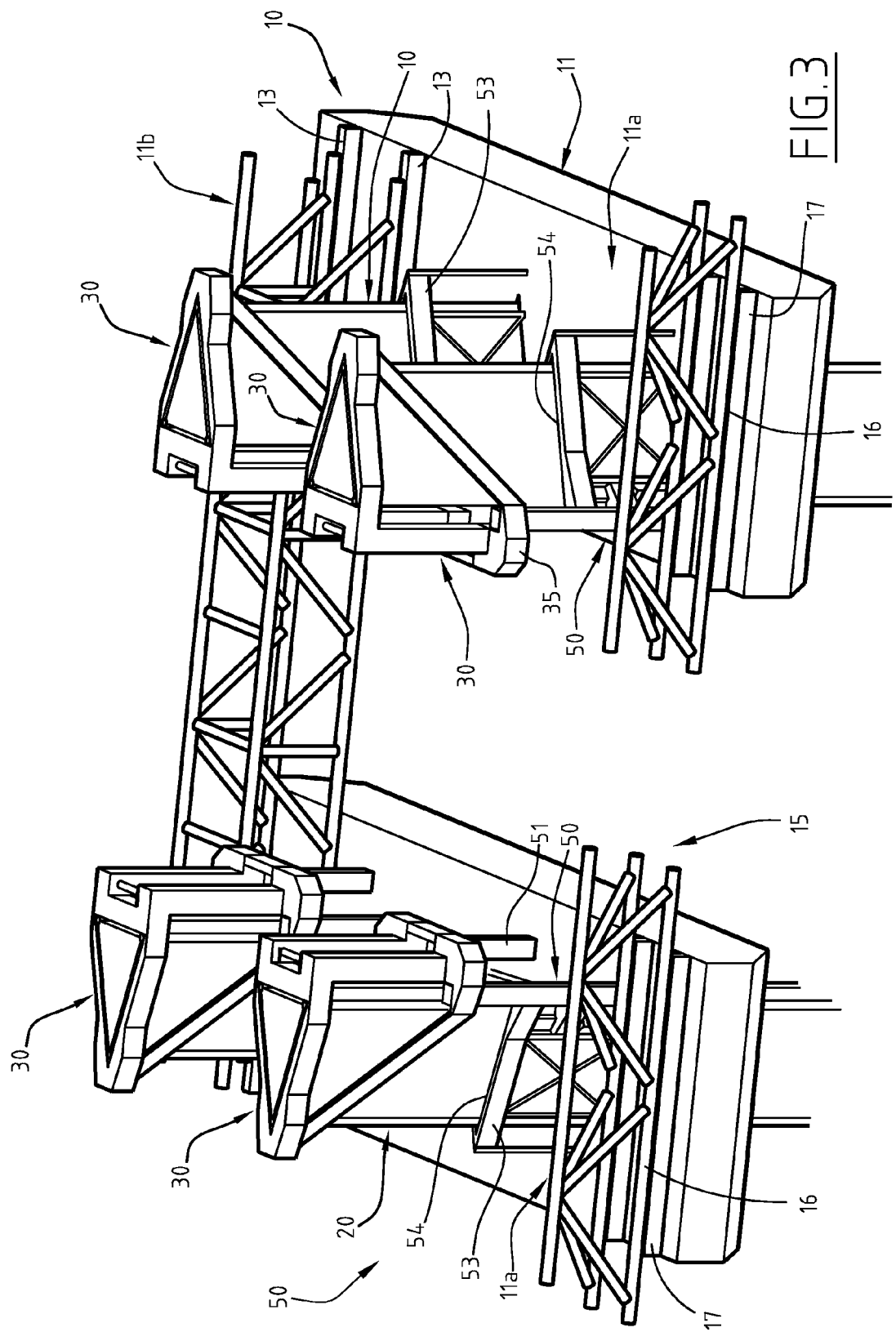
FIG. 3 is a diagrammatic perspective view of the structure with the shuttles in the high position.

FIGS. 1 to 3 diagrammatically illustrate a structure 10 intended for the transport and installation of at least one wind turbine and preferably two wind turbines.

This structure 10 can also be used for the transport and installation of at least one underwater generator and preferably two underwater generators.

In the following, we will describe the transport and installation of a wind turbine, the transport and installation of another wind turbine being identical.

Generally, the structure 10 comprises a U-shaped floating hull 11 including two parallel lateral arms 11a opposite each other, connected to each other by a central arm 11b.

The lateral arms 11a are formed by two floats extending parallel to each other and forming a free space between them and the central arm 11b is formed by a cross beam 11c borne by said lateral branches 11a.

Preferably, the cross beam 11c forming the central arm is made up of a mesh of tubes connected to each other by longitudinal elements.

The lateral arms 11a of the structure 10 can be moved by sliding relative to each other on the cross beam 11c so as to adjust their separation, as will be seen later.

To that end, the float of each lateral arm 11a includes a moving means 13 on the cross beam 11c for example formed by an assembly including guide rails and a rack-and-pinion system, not shown, and of a known type.

Moreover, the float of each lateral arm 11a is equipped with locking means, not shown, on the cross beam 11c so as to keep the separation between said lateral arms 11a constant and determined.

Thus as shown in FIGS. 1 and 3, the hull 11 includes, at its open portion, i.e. opposite the central arm 11b, a door generally designated by reference 15.

This door 15 is formed by two beam sections 16 opposite each other and movable by sliding each on a lateral arm 11a.

The two beam sections 16 can be moved between a separated position, as shown in FIG. 3, in which they free the inlet of the structure 10 for the positioning of a vessel, a dock or a barge and a closed position of said inlet of the structure 10, as shown in FIG. 1, in which they are closer together and in contact with each other.

To that end, each lateral arm 11a of the hull 11 includes means 17 for moving each beam section 16. This means 17 is for example formed by an assembly including guide rails and a rack-and-pinion system or using any other known means.

Lastly, each lateral arm 11a also includes a locking means, not shown, for locking the corresponding beam section 16 in the closed position or in the open position.

The hull 11 is equipped with legs 20 vertically movable relative to said floating hull 11. In the embodiment shown in the figures, the hull 11 is equipped with four legs 20 arranged in pairs on each lateral arm 11a of the hull 11.

Each of the legs 20 for example has a triangular section as shown in the figures, or a square or circular section.

Figure 6:
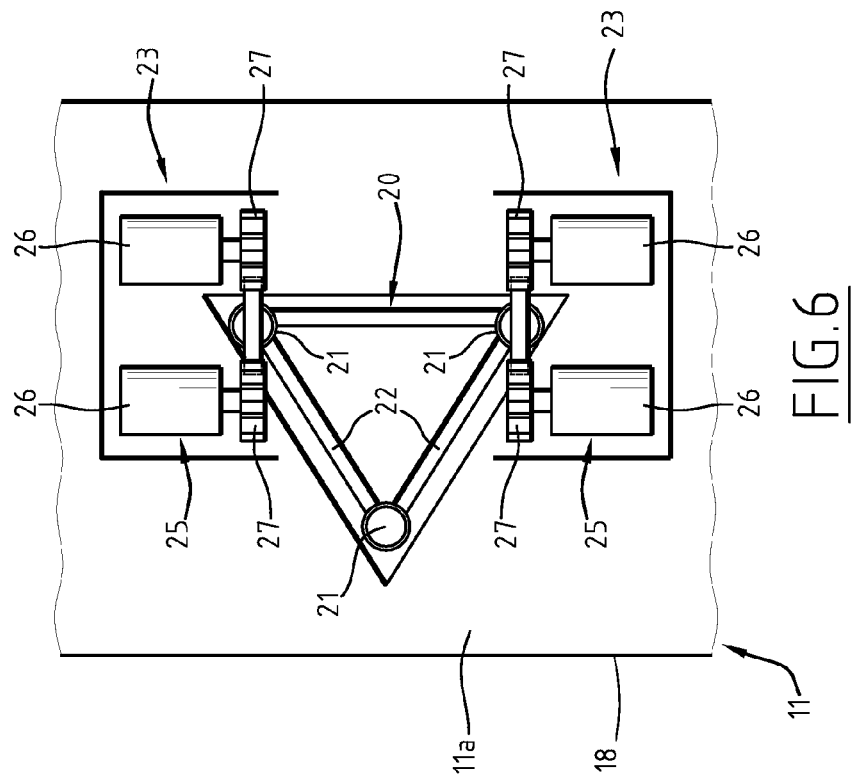
FIG. 6 is a cross-sectional view along line 6-6 of FIG. 5.
Figure 5:
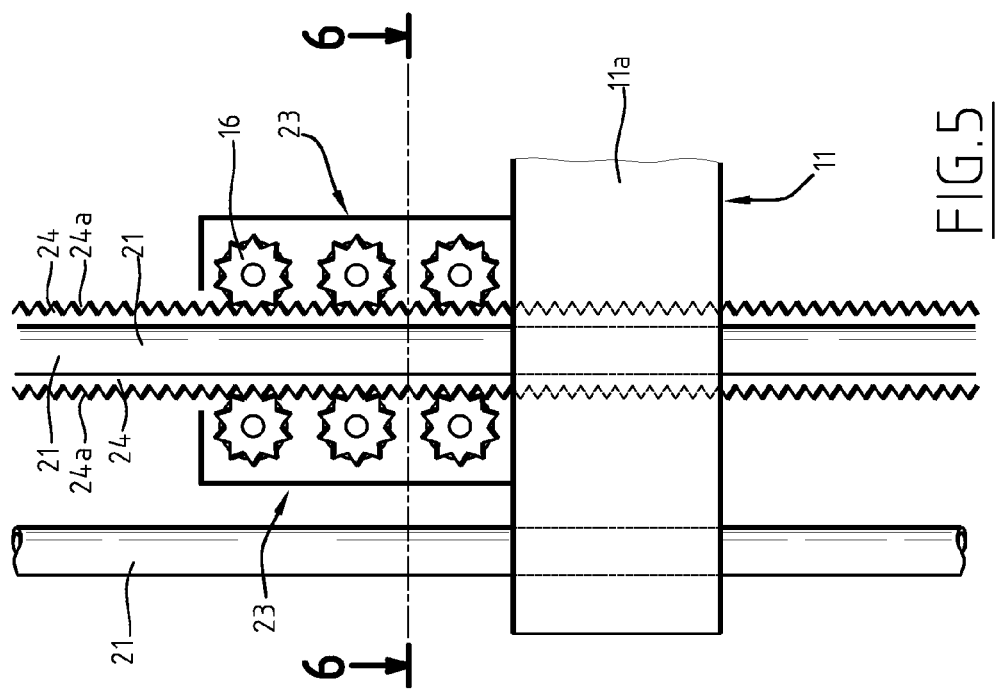
FIG. 5 is a partial view in vertical cross-section of the mechanical means for moving a leg of the structure.

As appears in particular in FIGS. 5 and 6, each leg 20 is formed, traditionally, by three flanges 21 connected to each other by a mesh of metal girders 22 or by solid legs. Each leg 20 is combined with a mechanical movement means designated by a general reference numeral 23.

The mechanical movement means 23 is housed in a supporting framework 18, also called a "jack-house," that is supported by the hull 11.

As shown in FIGS. 5 and 6, the mechanical movement means 23 of each leg 20 comprises, on one hand, two opposite plates 24 each borne by a flange 21 of the corresponding leg 20 and including, each on each lateral face, a series of teeth 24a forming a double rack on the two flanges 21.

The mechanical movement means 23 also comprises several assemblies 25 distributed on either side of the plate 24, along the height thereof. Each assembly 25 comprises a gear motor 26 ensuring the driving of a pinion 27 that meshes with a series of teeth 24a of the corresponding plate 24.

In the embodiment shown in FIGS. 5 and 6, the two series of teeth 24a of each plate 24 are associated with six pinions 27 each driven in rotation by a gear motor group 26.

The structure 10 also includes, combined with each of the legs 20, a shuttle designated by general reference 30 that can be moved by the corresponding leg 20 between a lower position bearing on the floating hull 11 as shown in FIG. 1, and a higher position as shown in FIG. 3.

The shuttles 30 combined with the legs 20 are moved simultaneously by the legs 20.

Figure 4:
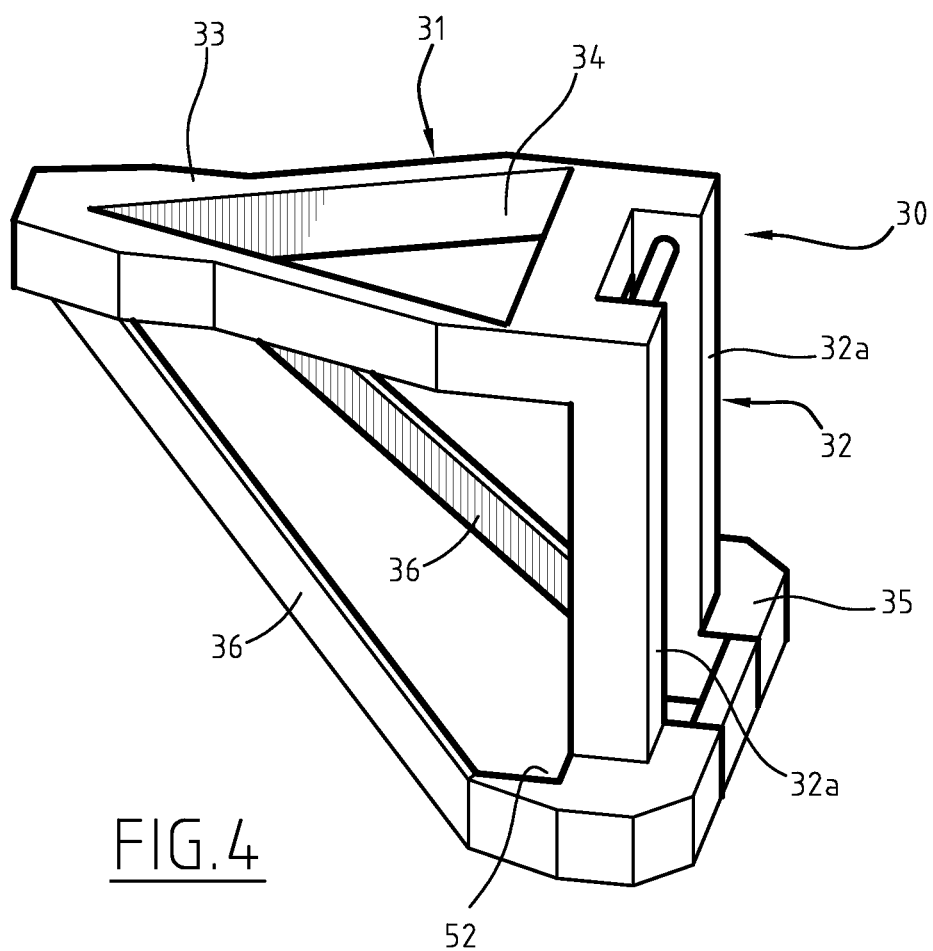
FIG. 4 is a diagrammatic perspective view of a shuttle of the structure.

In the embodiment shown in FIG. 4, each shuttle 30 is formed by a body 31 including a vertical arm 32 extending substantially parallel to the flanges 21 of the corresponding leg.

The vertical arm 32 is formed by two parallel vertical beams 32a.

The arm 32 is provided, on one hand, in its upper portion with a plate 33 extending substantially perpendicular to said arm 32 and, on the other hand, in its lower portion, a horizontal supporting base 35 for supporting a pair of higher and lower arms globally designated by reference 60 and 70 (FIG. 1), and that will be described later.

The plate 33 includes an opening 34 having a cross-section with a shape complementary to the transverse section of the corresponding leg 20 and, in the case at hand, a triangular-shaped cross-section. The plate 33 is connected to the base 35 by stiffening beams 36.

Each shuttle 30 is provided with a locking means 40 for locking on the corresponding leg 12 and/or a set of small beams (not shown) situated on the upper portion of the shuttle 30 that are moved by sliding towards the inside of the shuttle 30 and the leg 20 that makes it possible, by raising the leg 20 upwards, to drive the corresponding shuttle 30.

Figure 7:
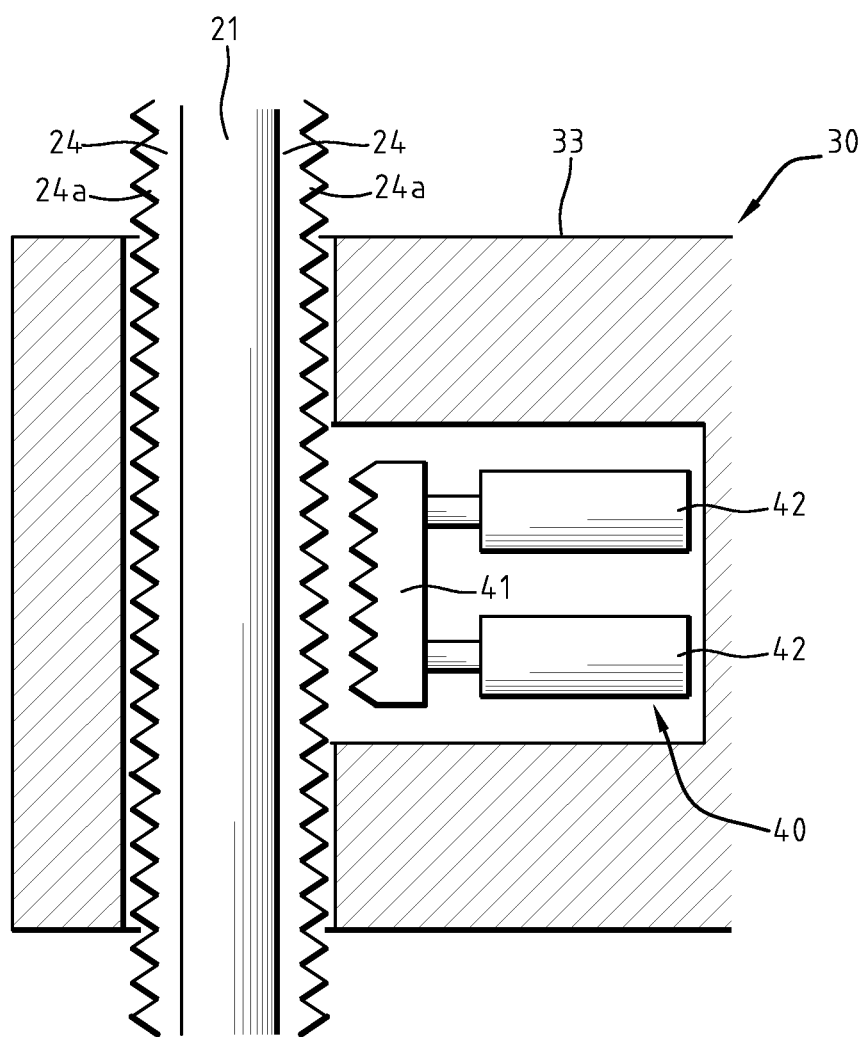
FIG. 7 is a diagrammatic view in vertical cross-section of the means for locking a shuttle on a leg of the structure, according to the invention.

This locking means 40, shown in more detail in FIG. 7, is formed by at least one counter-rack 41 for each plate 24.

The counter-rack 41 can be moved by at least one actuating member 42 and, preferably, by two actuating members 42 for example formed by hydraulic or pneumatic jacks in order to move the counter-rack 41 between a retracted position and a locking position engaged on a series of teeth 24a of the corresponding leg 20.

The assembly formed by the counter-rack 41 and the actuating members 42 is carried by the plate 33 of each shuttle 30.

The hull 11 also includes, at each leg 20, a means 50 for guiding the corresponding shuttle 30 between the low (FIG. 1) and high (FIG. 3) positions, respectively.

As shown in these FIGS. 1 and 3, the means 50 for guiding the shuttle 30 of each leg 20 comprises two vertical columns 51 extending vertically substantially parallel to the corresponding leg 20. Each column 51 cooperates with a passage 52 formed in the base 35 of the shuttle 30 and each of these passages 52 has a section with a shape combined with the cross-section of the corresponding column 51. The two columns 51 are connected to each other by a connecting plate 53 extending substantially perpendicular to said columns 51 that includes a central passage 54 (FIG. 3) having a section with a shape complementary to the transverse cross-section of the corresponding leg 20 and, in the case at hand, a triangular cross-section. The connecting plate 53 forms a guide for the corresponding leg 20.

During the movement of the shuttle 30 between the low position and the high position, by the leg 20, the base 35 of the shuttle 30 is guided by the columns 51 and in the low position shown in FIG. 1, the plate 31 of the shuttle 30 bears on the upper end of each column 51.

Generally, the transport structure 10 includes at least one support assembly for assembling a wind turbine 1 and preferably, as shown in the figures, two support assemblies each for a wind turbine 1.

Figure 14:
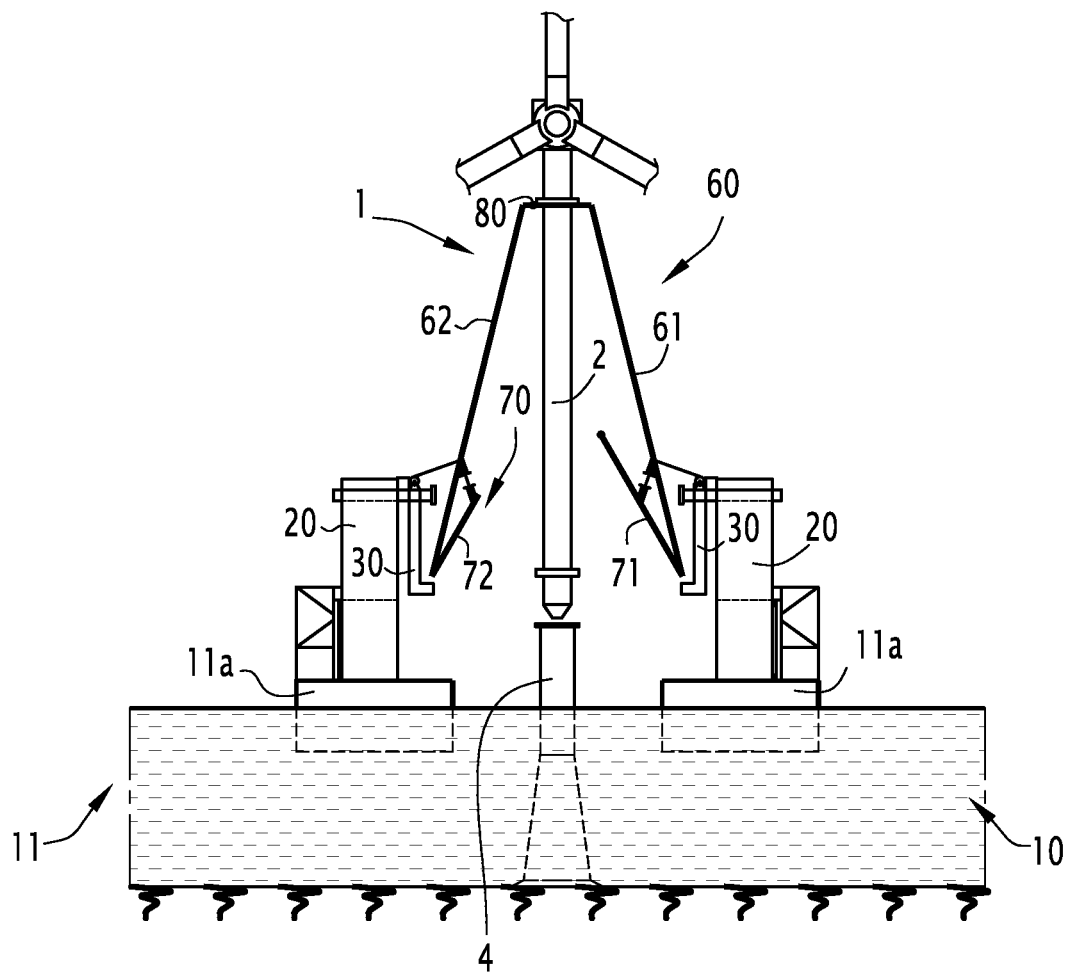

As shown in FIGS. 1 and 2, the wind turbine 1 is made up of a mast 2 bearing a nacelle 3 enclosing the electricity production means, not shown, driven by blades 4a. The mast 2 is intended to be fitted into a base 4, as shown in FIG. 14, for example, anchored on the sea bottom beforehand.

As shown in FIGS. 1 and 2, the mast 2 includes, in its upper portion, a collar 5.

In reference now to FIGS. 1 and 2, we will describe an assembly for supporting a wind turbine 1, the other support assembly of the other wind turbine 1 being identical.

The support assembly of the wind turbine 1 is made up of two shuttles 30 opposite each other and each combined with a leg 20.

The shuttles 30 carry a pair of higher arms 60 and a pair of lower arms 70.

The pair of upper arms 60 includes a first arm 61 borne by a first shuttle 30 and a second opposite arm 62 borne by a second shuttle 30 opposite the first shuttle 30 and the pair of lower arms 70 includes a first arm 71 borne by the first shuttle 30 and a second opposite arm 72 borne by the second shuttle 30. The arms 61 and 71 can be moved by pivoting around a horizontal axis 63 borne by the first shuttle 30 and the arms 62 and 72 can be moved by pivoting around a horizontal axis 64 borne by the second shuttle 30 between a substantially vertical retracted position and an active position tilted against the mast of the wind turbine, as shown in FIGS. 1 and 2, for example.

The arms 61 and 62 of the pair 60 of higher arms each have a length substantially equal to the height of the mast 2 of the wind turbine 1 and the arms 71 and 72 of the pair 70 of lower arms have a length substantially equal to half the distance separating the inner edges of the two lateral arms 11a of the hull 11.

Alternatively, the arms 61 and 62 have a variable length that can be adjusted as a function of the height of the collar 5 on the mast 2 of the wind turbine. The arms are for example telescoping and provided with immobilization means for a given length.

The free ends of arms 71 and 72 of the pair 70 of lower arms include a gripping assembly for example formed by jaws 73 or by any other suitable gripping means of a known type.

Figure 8:
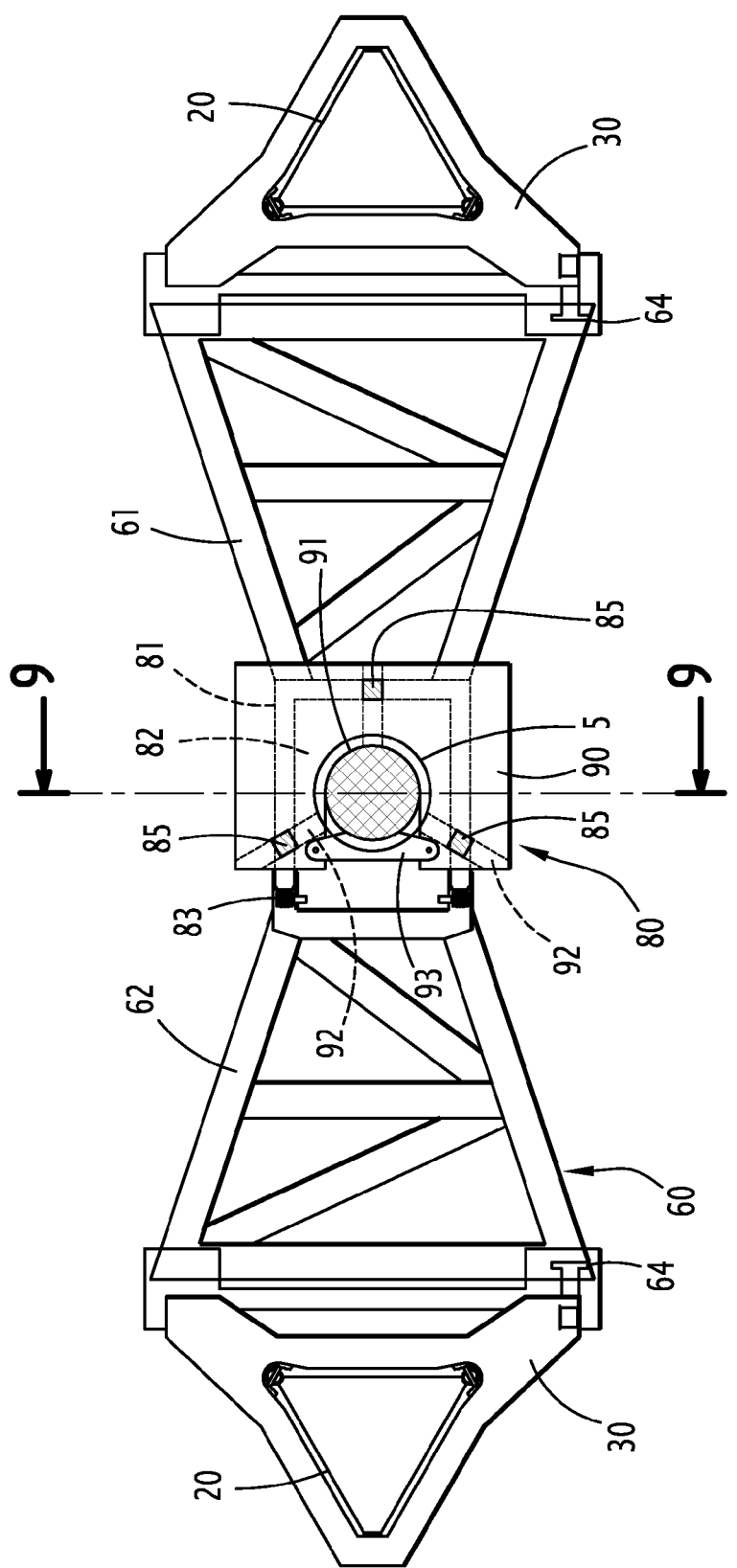
FIG. 8 is a top view of the pair of higher arms and the means for compensating the horizontal movements of the hull relative to the mast of the wind turbine.
Figure 9:
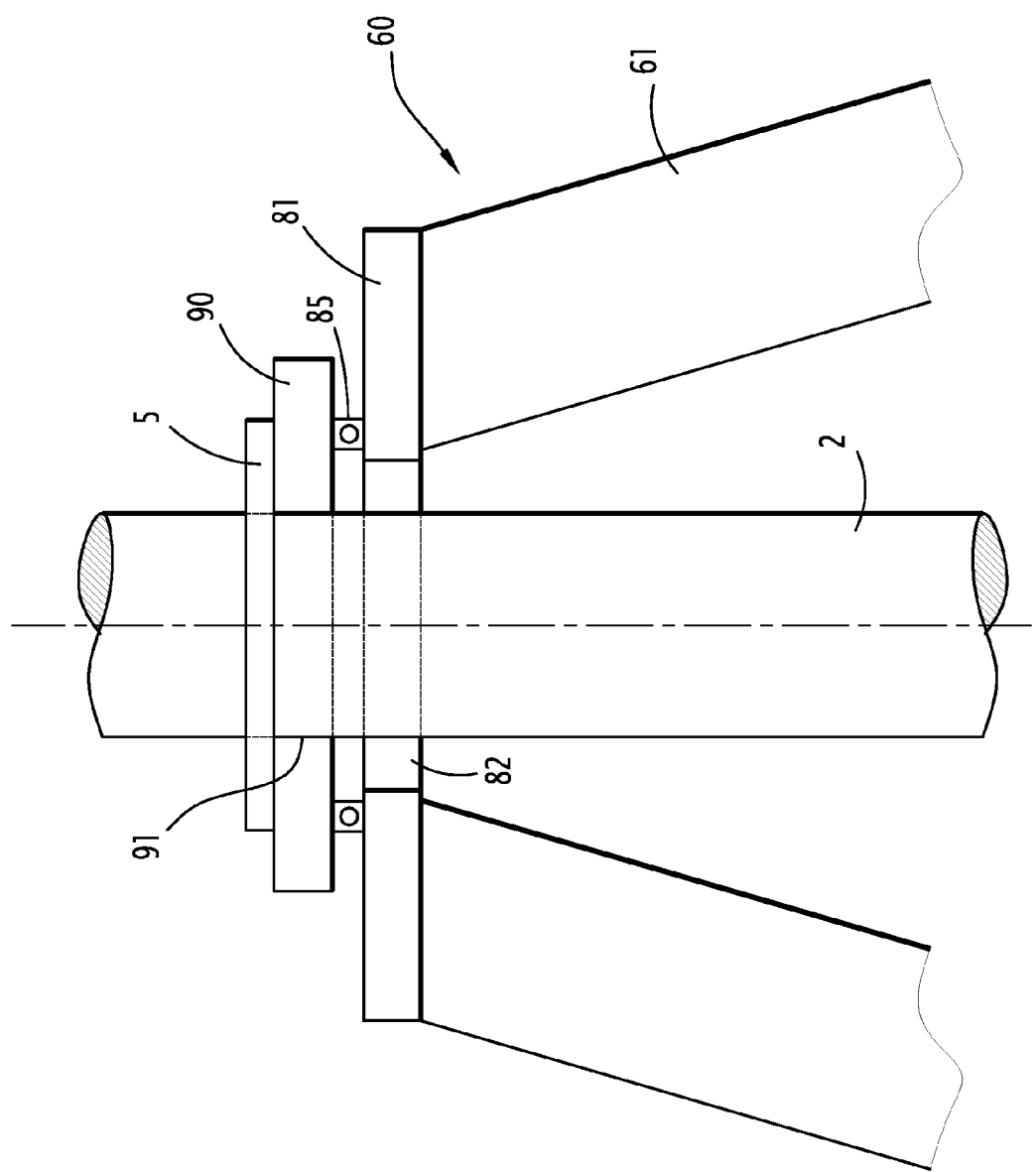
FIG. 9 is a cross-sectional view along line 9-9 of FIG. 8, FIGS. 10 and 11 are two diagrammatic top views of the structure showing the movements of said structure relative to the mast of the wind turbine placed in its base.

As shown in FIGS. 8 and 9, the arms 61 and 62 of the pair 60 of upper arms include a means 80 for offsetting the horizontal movements of the hull 11 relative to the mast 2 after it is introduced in the base 4 and the tilting of the pair 70 of lower arms in the retracted position, as will be described later.

As shown in these figures, the offsetting means 80 includes a support assembly for supporting the mast 2 via the collar 5. This support assembly includes a sliding means formed in a plate 81 provided with a U-shaped housing 82 and fastened to the free end of one of the arms of the pair 60 of higher arms and in particular the free end of the arm 61 of the pair 60 of higher arms. This plate 81 is intended to cooperate with a locking system 83, of a known type, mounted at the free end of the arm 62 of the pair 60 of higher arms in the active position tilted against the mast 2 of the wind turbine 1, as shown in FIG. 8. This U-shaped plate 81 is formed by a rail intended to receive rolling members 85.

The U-shaped housing 82 of the plate 81 has a width larger than the diameter of the mast.

The sliding means of the support assembly of the mast 2 also comprises a platen 90 provided with a U-shaped housing 91 having a width substantially equal to the diameter of the mast 2. This platen 90 can be moved on the plate 81 by the rolling members 85 along a horizontal plane substantially parallel to the support assembly of the mast. To that end, the lower face of the platen 90 includes three rails 92 forming a 120° angle between them.

The platen 90 includes a latch 93 for closing the U-shaped housing 91 and that can be moved between an open position making it possible to position the mast 2 inside the housing 91 of the platen 90, as well as inside the housing 82 of the plate 81 and a closing position of the housing 91, as shown in FIG. 8.

Thus, the sliding means of the support assembly formed by the plate 81, the platen 90 and the rolling members 85 offset the horizontal movements of the hull 11 relative to the mast 2 when the latter part is introduced into the base 4, and after the tilting of the pair 70 of lower arms in the retracted position in order to free the lower portion of the mast 2 relative to the hull 11.

Figure 10:
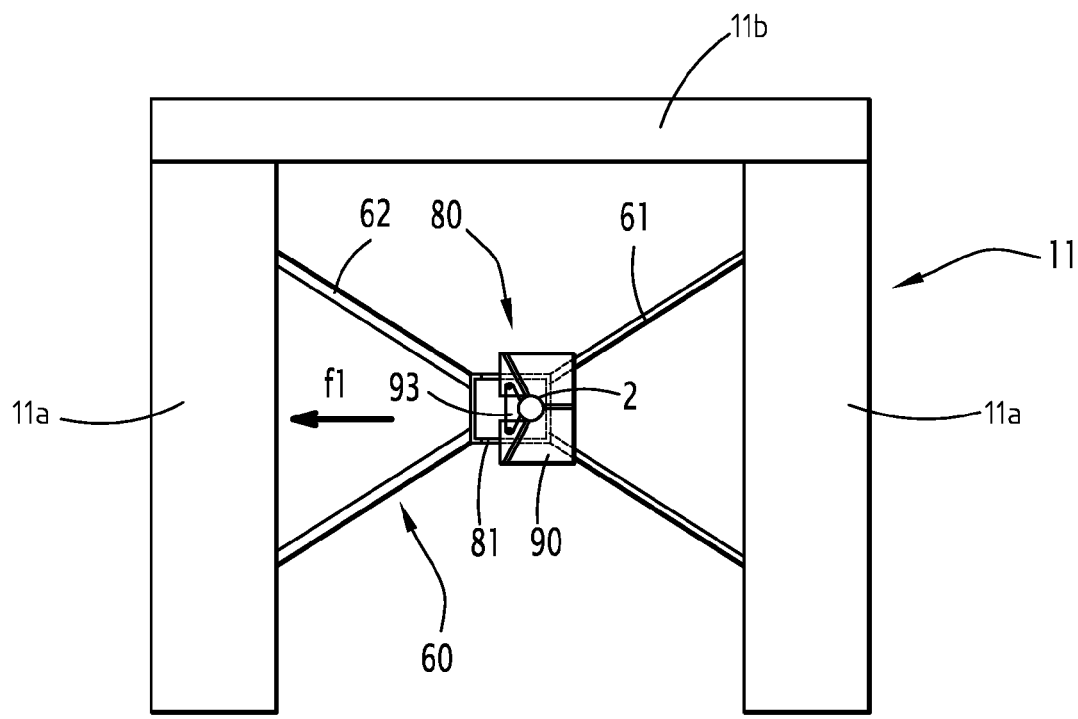
Figure 11:
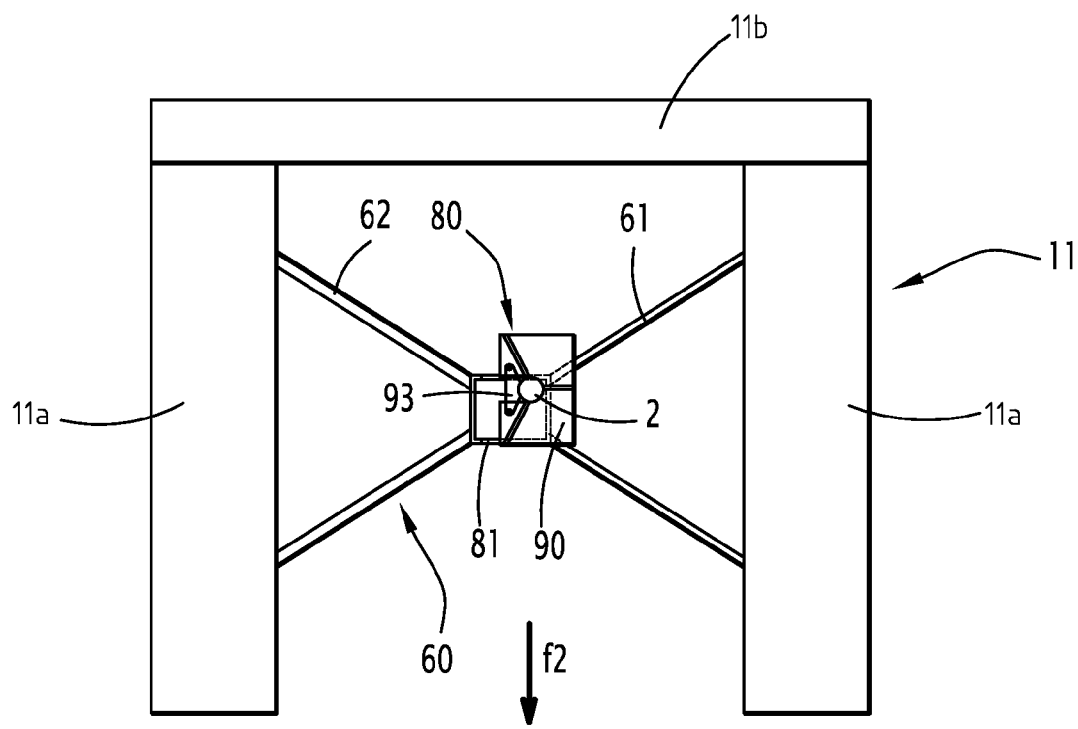

As an example and as shown in FIGS. 10 and 11, this sliding means allows the horizontal movement of the hull 11 in a direction f1 without the mast 2 moving, as shown in FIG. 10 or a horizontal movement of the hull 11 along a direction f2 without the mast 2 of the wind turbine 1 moving.

This sliding means therefore prevents any transmission of stresses or strains in the base 4, and any buckling of the mast 2, after placement of the mast 2 of the wind turbine 1 in said base 4.

According to the manner in which the wind turbine(s) is (are) placed in the structure 10, the U-shaped housings 82 and 91 of the plate 81 and the platen 90, respectively, are oriented perpendicular to the longitudinal axis of said hull 11 towards the open portion of said hull 11.

Referring now to FIGS. 12 to 15, we will describe a first method for transport and installation of at least one wind turbine 1.

Figure 12:
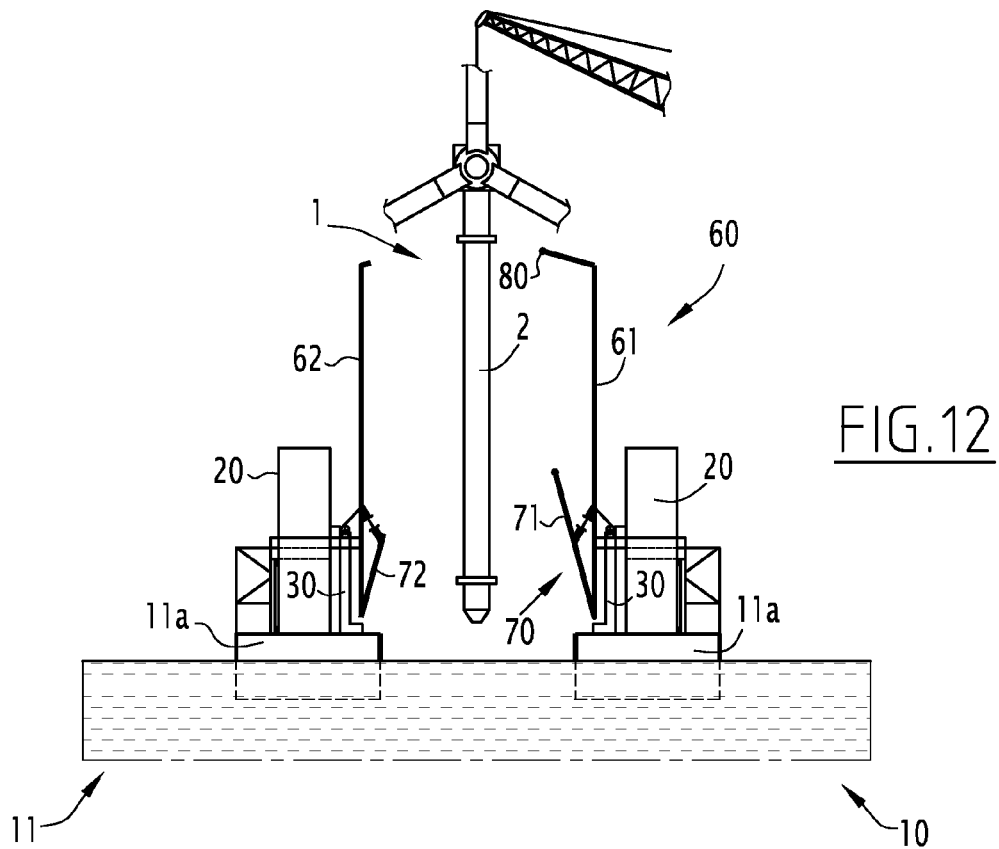
FIGS. 12 to 15 are diagrams showing the different transport and installation steps for a wind turbine according to a first example.

First of all, the structure 10 is positioned near a loading zone for loading the wind turbine 1 with the legs 20 in the high position and the shuttles 30 in the low position bearing against the hull and with the arms 61 and 62 and the arms 71 and 72, respectively, of the pair 60 of higher arms and the pair 70 of lower arms, in the substantially vertical retracted position, as shown in FIG. 12.

The wind turbine 1 is raised by a hoisting engine, such as a crane for example, and the mast 2 of the wind turbine 1 is placed between the lateral arms 11a of the hull 11, as shown in FIG. 12.

Figure 13:
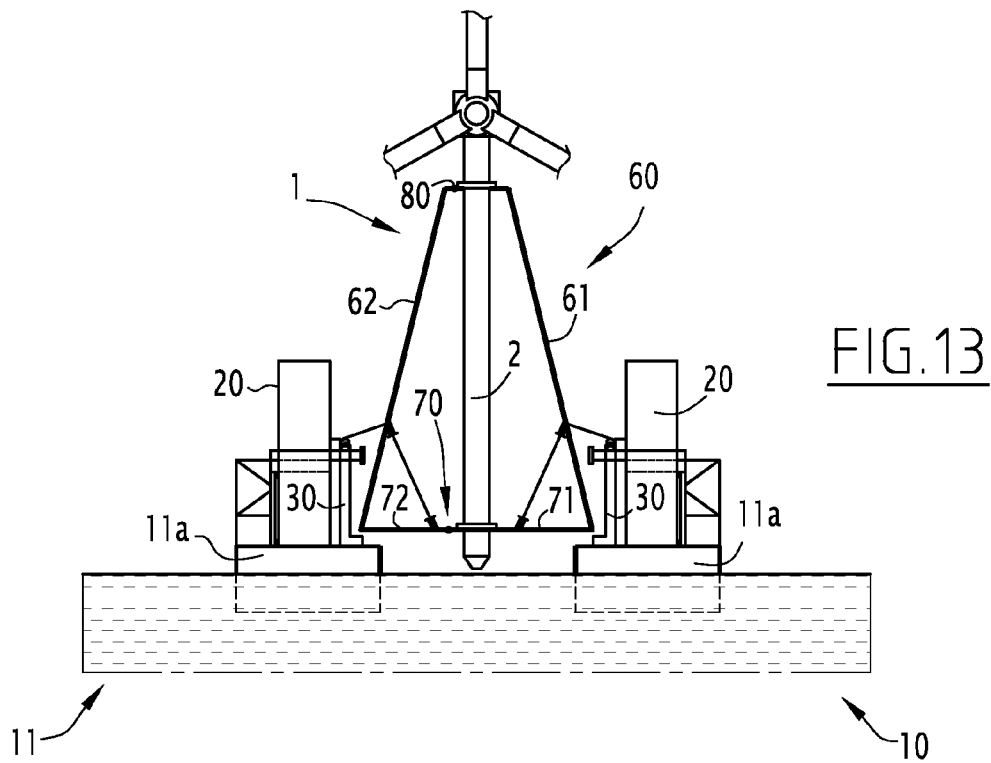

The arm 61 including the U-shaped housings 82 and 91 of the plate 81 and of the platen 90 is tilted in the active position to place the mast 2 in these U-shaped housings 82 and 91 below the collar 5 of the mast 2. The arm 62 of the pair 60 of higher arms is then tilted in the active position and the arms 61 and 62 are secured to each other by the locking system 83 (FIG. 13). The U-shaped housing 91 of the platen 90 is closed by the latch 93.

The mast 2 is lowered by the crane to make the collar 5 bear on the platen 90, as shown in FIG. 13, and the arms 71 and 72 of the pair 70 of lower arms are simultaneously tilted to the active position to hold the mast 2 at its lower portion.

The placement of the second wind turbine on the structure 10 is done similarly.

The platen 90 is locked during the transport of the plate 81.

The structure 10 bearing the wind turbine or two wind turbines 1 is moved to an installation site at which one or two bases 4 have been previously installed on the sea bottom.

The placement of the mast 2 of each wind turbine 1 on its corresponding base 4 is done as follows.

The legs 20 are lowered and each shuttle 30 is locked on the corresponding leg 20.

These legs 20 are raised to lift the mast 2 using the shuttles 30 and pairs 60 and 70 of higher and lower arms, as shown in FIG. 14. The door 15 made up of sections 16 is open. The structure 10 is moved so as to position the mast 2 in alignment with the base 4 and the arms 71 and 72 of the pair 70 of lower arms are tilted to the retracted position, as shown in FIG. 14. The platen 90 is unlocked from the plate 81.

Then, the legs 20, the shuttles 30 and the pair 60 of higher arms are lowered to gradually engage the mast 2 in the base 4. During this engagement, the horizontal movements of the hull 10 are offset by the offsetting means 80 provided on the pair 60 of higher arms such that the mast 2 still remains in a substantially vertical position.

Figure 15:
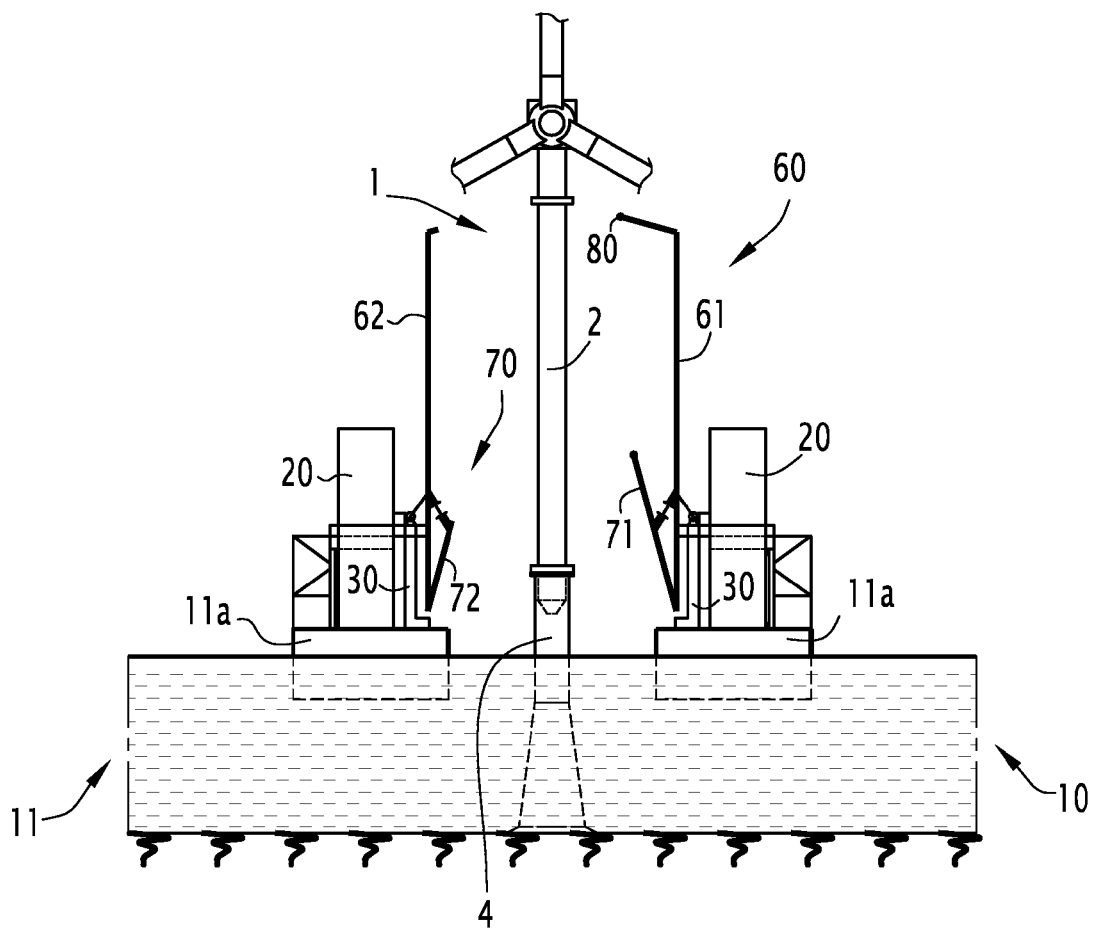

The mast 2 is placed in the base 4, and the arms 60 and 61 of the pair 60 of upper arms are unlocked and the latch 93 of the platen 90 is released to open the U-shaped housing 91. The arms 60 and 61 are tilted to the retracted position, as shown in FIG. 15.

The structure 10 is then removed and another mast 2 is placed on the base 4 of a second wind turbine in an identical manner.

In reference now to FIGS. 16 to 19, we will describe another method for transport and offshore installation of one or two wind turbines in the case where the one or two wind turbines are on a pontoon 8.

Figure 16:
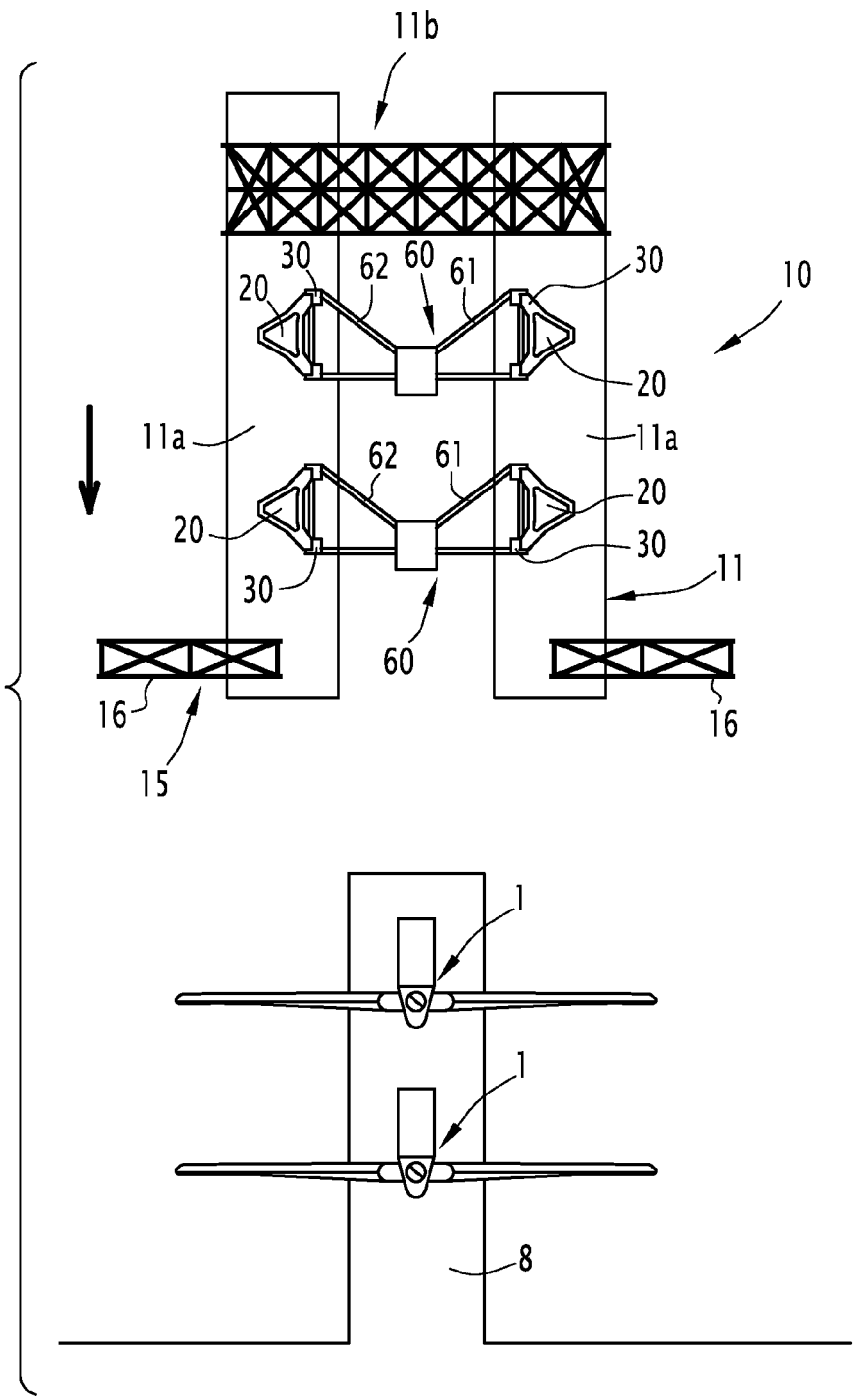
FIGS. 16 to 19 are diagrams showing the different transport and installation steps for a wind turbine according to a second example.

As shown in FIG. 16, the door 15 of the hull 11 is open and the legs 20 are placed in an intermediate position, while the shuttles 30 are placed in the low position bearing against the hull 11.

In this case, the U-shaped housings 82 and 91 of the plate 81 and the platen 90 are oriented in the longitudinal axis of the hull 11 towards the open portion of the hull 11. The arms 71 and 72 of the pair 70 of lower arms are in a substantially vertical retracted position.

Figure 17:
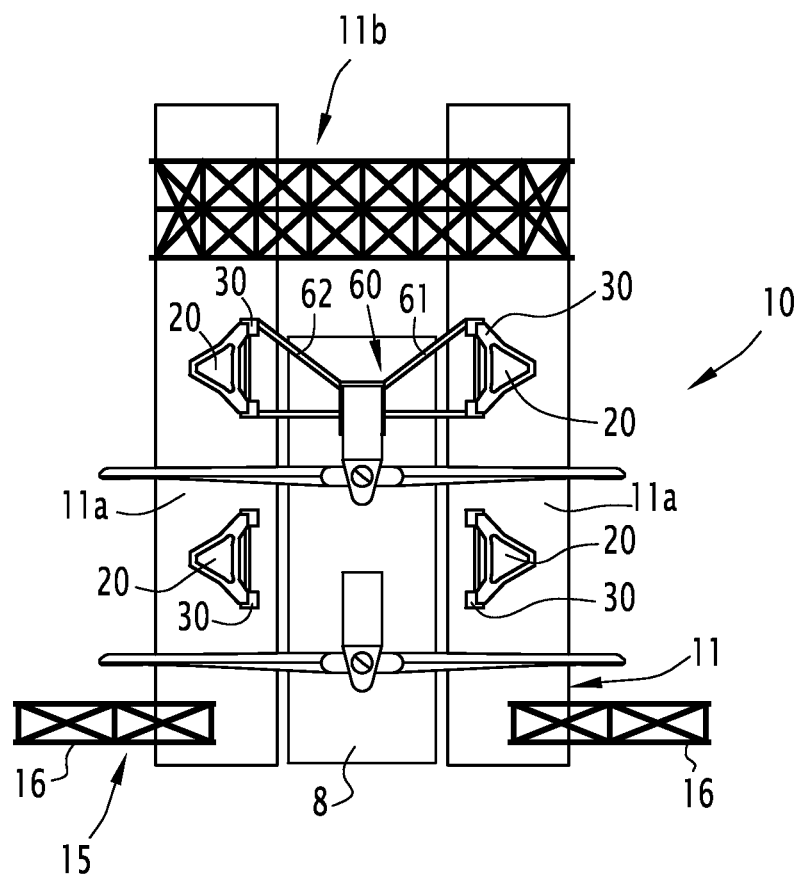

The arms 61 and 62 of the pair 60 of higher arms at the front of the hull 11 are in a substantially vertical retracted position and the arms 61 and 62 of the pair 60 of higher arms situated at the back of the hull 11 are placed in an active position and locked to each other as shown in FIG. 17. The U-shaped housing 91 of the platen 90 is open.

The structure 10 is moved towards the pontoon 8 to place the pontoon 8 between the lateral arms 11a of the hull 11.

Figure 18:
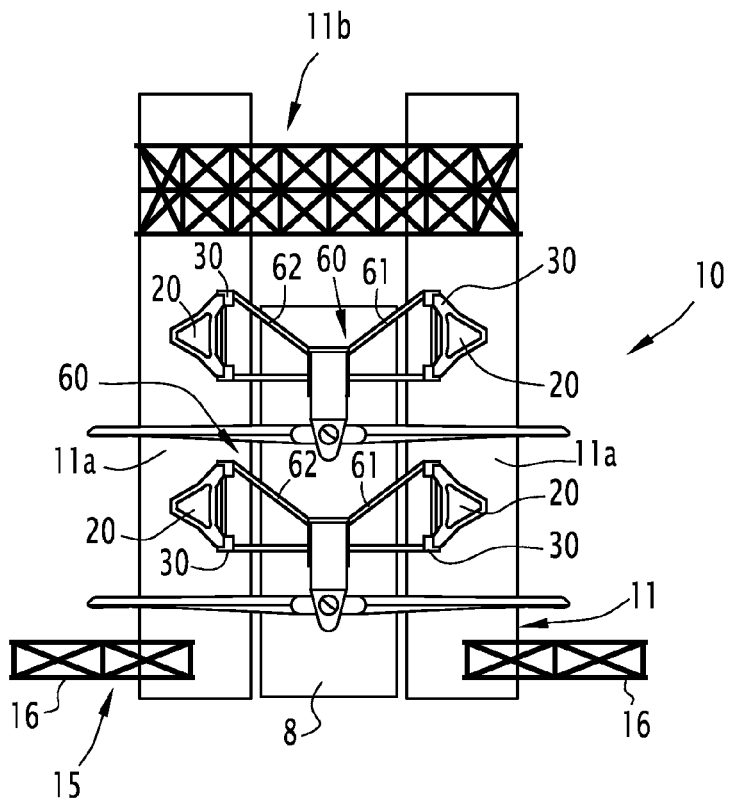
Figure 19:
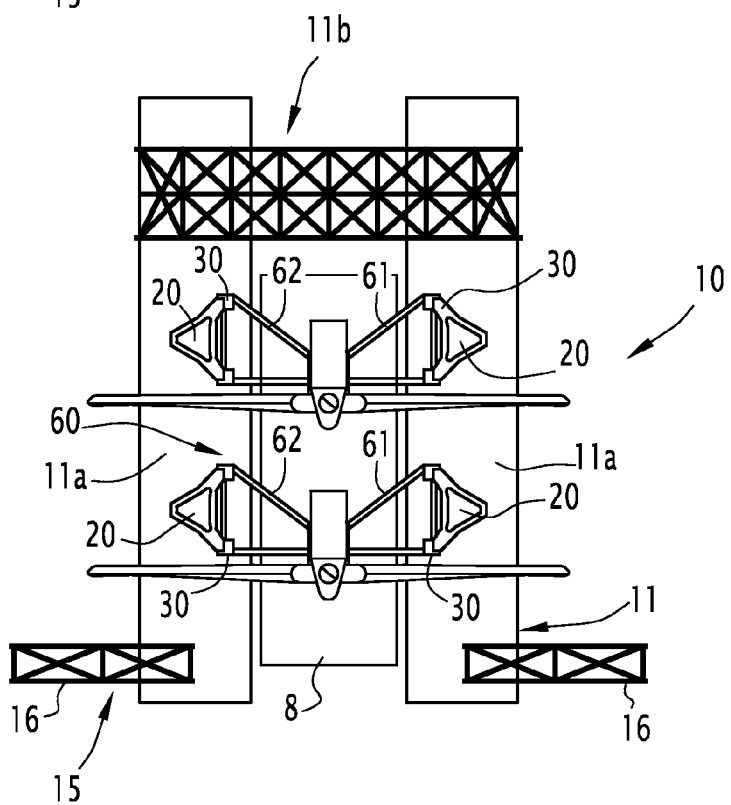

After the first wind turbine 1 passes beyond the first support assembly, as shown in FIG. 17, the arms 61 and 62 of the pair 60 of higher arms of the first assembly are tilted to the active position, as shown in FIG. 18, and the structure 10 is moved to engage the mast 2 of each wind turbine in the U-shaped housings 82 and 91 of the plate 81 and the platen 90, respectively, as shown in FIG. 19.

The latch 93 of the U-shaped housing 91 of each platen 90 is closed and the arms 71 and 72 of the pair 70 of lower arms of each assembly are tilted simultaneously to grip each mast 2 at its lower portion.

Each shuttle 30 is locked on the corresponding leg 20 the legs 20 are raised to lift the shuttles 30, and the pairs 60 and 70 of higher and lower arms are lifted by the shuttles 30 to bring the platen 90 of each assembly in contact with the collar 5 of the corresponding mast 2.

The mast 2 of each wind turbine 1 is lifted from the pontoon 8 via shuttles 30 and pairs 60 of upper arms by raising the legs 20, the pairs 70 of lower arms holding each mast 2 at its lower portion.

The legs 20 are then relowered to replace the shuttles in the low position bearing against the hull.

Each shuttle 30 is then unlocked from each corresponding leg 20 and the legs 20 are raised to the upper position, to minimize the draught.

Then, the structure 10 bearing the wind turbines 1 is moved to an installation site of each wind turbine 1 on its base 4, previously installed on the sea bottom.

The installation of each wind turbine 1 is done as follows.

The legs 20 are raised to lift the mast 2 using shuttles 30 and pairs 60 and 70 of arms and the structure 10 is moved to position the mast 2 in alignment with the base 4. The arms 71 and 72 of the pair 70 of lower arms are tilted to the retracted position and the same steps are carried out as in the preceding method.

Also in this case, when the mast 2 is engaged with the corresponding base 4 and after tilting of the pair 70 of lower arms, the horizontal movements of the hull are offset by the offsetting means 80 of the pair 60 of higher arms such that the mast 2 still remains in the substantially vertical position.

According to another method for placing one or two wind turbines on the hull 11 of the structure 10, the one or two wind turbines can be mounted on the wagons moving on the rails. To that end, each wagon is equipped with pairs 60 and 70 of higher and lower arms in order to keep the wind turbine in a substantially vertical position. The wind turbines are positioned on the structure 10 by moving the wagon(s) by rolling on the rails between the pontoon and the structure 10 to position the pairs of arms bearing the wind turbine on the corresponding shuttles.

To transport and install an underwater generator, the same steps are carried out. But, in this case, the base does not extend past the surface of the water and, after placing the mast on its base, the nacelle containing the electricity producing means and bearing the blades is lowered below the surface of the water by sliding on its mast. For this application, the arms of the pair of higher arms have a length smaller than that provided for the installation of a wind turbine.

The structure for placement and installation of at least one wind turbine or at least one underwater generator has the advantage of preventing stresses or strains from having repercussions on the base due to the movements of the hull created by the swell.

The invention is not limited to the installation of wind turbines borne by the base 4 placed on the bottom of the expanse of water. Alternatively, the base 4 floats on the surface of the water and is anchored on the bottom of the expanse of water.

What is claimed is:

1. A structure for transport and offshore installation of at least one wind turbine or underwater generator comprising a nacelle and blades borne by a mast intended to be mounted on a base anchored on the sea bottom, wherein the structure includes:
   a U-shaped floating hull provided with two parallel lateral arms, each having at least one leg vertically movable relative to the hull in flotation using movement mechanisms, and
   at least one assembly for supporting said at least one wind turbine or underwater generator, made up of two shuttles opposite each other and each combined with one of the at least one leg and each having two pairs of arms that are higher and lower, respectively, and pivotably movable around a horizontal axis between a retracted position and an active position tilted against the mast of the wind turbine or underwater generator, the arms of the pair of higher arms including an offsetting means for offsetting horizontal movements of the hull relative to the mast after the mast is introduced into the base and after the tilting of the pair of lower arms to the retracted position.

2. The structure according to claim 1, further optionally comprising said mast of said at least one wind turbine or underwater generator and wherein the at least one assembly includes two symmetrical assemblies for supporting said mast of said at least one wind turbine or underwater generator.

3. The structure according to claim 1, wherein each shuttle includes a means for locking on the corresponding leg.

4. The structure according to claim 1, further comprising said mast of said at least one wind turbine or underwater generator and wherein each arm of the pair of higher arms has a length substantially equal to the height of said mast of said at least one wind turbine or underwater generator.

5. The structure according to claim 1, wherein each arm of the pair of upper arms is provided with a means for adjusting the length of the arm.

6. The structure according to claim 1, wherein each arm of the pair of lower arms has a length substantially equal to half the distance separating the inner edges of the two lateral arms of the hull.

7. The structure according to claim 1, wherein the free ends of the arms of the pair of lower arms together include an assembly for gripping the mast.

8. The structure according to claim 1, wherein the offsetting means is mounted at free ends of the arms of the pair of higher arms and include an assembly for supporting the mast via a collar formed on the mast and a sliding means for the horizontal movements of the hull relative to the mast after the introduction of the mast in the base and the tilting of the pair of lower arms to the retracted position.

9. The structure according to claim 8, wherein the sliding means of the support assembly comprises a plate provided with a U-shaped housing, fastened to the free end of one of the arms of the pair of higher arms and intended to cooperate with a locking system mounted at the free end of the other arm of the pair of higher arms and a platen provided with a U-shaped housing and movable via rolling members on the plate along a horizontal plane relative to the mast.

10. The structure according to claim 9, wherein the directions of movement of the platen on the plate form a 120° angle between them.

11. The structure according to claim 9, wherein the platen includes a latch for closing the U-shaped housing of the platen.

12. The structure according to claim 9, wherein the U-shaped housings, of the plate and the platen, respectively, are oriented perpendicularly to the longitudinal axis of the hull.

13. The structure according to claim 9, wherein the U-shaped housings, of the plate and the platen, respectively, are oriented in the longitudinal axis of the hull towards the open portion of the hull.

14. A method for transport and offshore installation of at least one wind turbine or underwater generator using a structure according to claim 1, wherein the method comprises the following steps:
  positioning the structure near a loading zone of the wind turbine or underwater generator;
  placing the legs in the high position and the shuttles in the low position bearing against the hull with the arms of the two pairs of arms in the retracted position,
  lifting the wind turbine or underwater generator and placing the mast of said wind turbine or underwater generator between the two lateral arms of the hull,
  tilting the arm including the U-shaped housings of the pair of higher arms in the active position such that the U-shaped housings are placed below the collar,
  tilting the other arm of the pair of higher arms to the active position and locking said arms relative to each other,
  closing the U-shaped housing of the platen using the latch,
  lowering the mast to make the collar bear on the platen,
  simultaneously tilting the arms of the pair of lower arms to the active position to hold the lower portion of the mast,
  locking the platen to the arms,
  moving the structure bearing the at least one wind turbine or underwater generator to an installation site on a base previously installed on the sea bottom,
  lowering the legs and locking each shuttle on the corresponding leg,
  raising the legs to lift the mast using the shuttles and pairs of arms,
  moving the structure to position the mast for alignment with the base,
  unlocking the platen from the arms,
  tilting the arms of the pair of lower arms to the retracted position, the horizontal movements of the hull being offset by the offsetting means of the pair of higher arms,
  lowering the legs, the shuttles and the pair of higher arms to place the mast in the base,
  opening the U-shaped housing of the platen,
  unlocking the arms of the pair of higher arms,
  tilting the arms of the pair of higher arms to the retracted position, and
  removing the structure.

15. A method for transport and offshore installation of at least one wind turbine or underwater generator using a structure according to claim 1, wherein the method comprises the following steps:
  opening the door of the hull,
  placing the legs in an intermediate position and the shuttles in a low position bearing against the hull,
  placing the arms of the pair of higher arms in the active position and locking them relative to each other with the U-shaped housing of the open platen,
  moving the structure to place a pontoon including at least one wind turbine or underwater generator between the lateral arms of the hull,
  engaging the mast in the U-shaped housings of the plate and the platen,
  closing the U-shaped housing of the platen using the latch,
  simultaneously tilting the arms of the pair of lower arms to hold the lower portion of the mast,
  locking each shuttle on the corresponding leg,
  raising the legs to lift the shuttles and the pairs of higher and lower arms to bring the platen in contact with the collar of the mast,
  raising the mast from the pontoon via the shuttles and the pairs of higher and lower arms by lifting the legs,
  removing the structure bearing at least one wind turbine to place it away from the pontoon,
  relowering the legs to replace the shuttles in the lower position bearing against the hull,
  unlocking each shuttle on the corresponding leg,
  lifting the legs to the higher position,
  closing the door of the structure,
  moving the structure bearing said at least one wind turbine or underwater generator to an installation site on a base previously installed on the sea bottom,
  lowering the legs to a low or intermediate position,
  locking each shuttle on the corresponding leg,
  raising the legs to lift the mast using the shuttles and the pairs of higher and lower arms,
  moving the structure to position the mast in alignment with the base,
  tilting the arms of the pair of lower arms to the retracted position, the horizontal movements of the hull being offset by the offsetting means of the pair of higher arms, lowering the legs, the shuttles and the pair of higher arms to place the mast in the base,
opening the U-shaped housing of the platen,
unlocking the arms of the pair of higher arms,
tilting the arms of said pair of higher arms to the retracted position, and
removing the structure.

* * * * *

UNITED STATES PATENT AND TRADEMARK OFFICE
CERTIFICATE OF CORRECTION

PATENT NO.       : 8,708,605 B2  
APPLICATION NO.  : 12/999761  
DATED            : April 29, 2014  
INVENTOR(S)      : Cholley et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-ninth Day of September, 2015

Michelle K. Lee
*Director of the United States Patent and Trademark Office*